United States Patent
Kokuwa et al.

(10) Patent No.: US 7,430,009 B2
(45) Date of Patent: Sep. 30, 2008

(54) IMAGE PICKUP DEVICE INCLUDING AN INFRARED-RAY CUT FILTER

(75) Inventors: Takashi Kokuwa, Osaka (JP); Masayuki Hino, Osaka (JP); Taisei Funaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 638 days.

(21) Appl. No.: 10/985,006

(22) Filed: Nov. 10, 2004

(65) Prior Publication Data
US 2005/0104990 A1     May 19, 2005

(30) Foreign Application Priority Data
Nov. 14, 2003    (JP) ............................. P2003-384897

(51) Int. Cl.
*H04N 5/225*    (2006.01)
(52) U.S. Cl. ..................... 348/342; 348/360
(58) Field of Classification Search ................ 348/342, 348/337, 336, 360
See application file for complete search history.

(56) References Cited

U.S. PATENT DOCUMENTS

| 6,778,325 | B2 * | 8/2004 | Osawa | 359/495 |
| 7,079,186 | B2 * | 7/2006 | Hashimoto | 348/342 |
| 7,224,396 | B2 * | 5/2007 | Oochi et al. | 348/345 |
| 7,233,358 | B2 * | 6/2007 | Yoshikawa | 348/340 |
| 2002/0163586 | A1 * | 11/2002 | Noguchi | 348/342 |

FOREIGN PATENT DOCUMENTS

JP    63-037889    2/1988

* cited by examiner

*Primary Examiner*—Tuan V Ho
(74) *Attorney, Agent, or Firm*—McDermott Will & Emery LLP

(57) ABSTRACT

A photographic light is spectrally separated by a spectral prism 9 provided in an image-formation area R of the photographic light whose luminous flux is adjusted by a group of lenses 1*a*-1*d* for adjusting the luminous flux so as to image-form the photographic light. Respective lights spectrally separated by the spectral prism 9 are imaged by means of the imaging elements 2. An infrared-ray element of the photographic light whose luminous flux is being adjusted is eliminated by an infrared-ray cut filter 8. The infrared-ray cut filter 8 is advanced and retreated by a mechanism unit 14*a* between a position in an optica path of the photographic light and a position distant from the optical path. In the foregoing constitution, the infrared-ray cut filter 8 and the mechanism unit 14*a* are disposed in a luminous flux convergence area R of the photographic light whose luminous flux is being adjusted by the group of lenses 1*a*-1*d*.

13 Claims, 5 Drawing Sheets

IMAGE PICKUP DEVICE INCLUDING AN INFRARED-RAY CUT FILTER

FIELD OF THE INVENTION

The present invention relates to an image pickup device having an optical system comprised of a lens system unit, optical filters, imaging elements, and the like.

BACKGROUND OF THE INVENTION

An optical system unit included in an image pickup device, such as a VCR-incorporated video camera, is mainly comprised of a plurality of lenses, an imaging element (CCD) and a spectroscope. The spectroscope comprises a spectral color filter or a spectral prism. In the optical system, optical components, such as iris, optical low-pass filter, and infrared-ray cut filter, are conventionally provided in an optical path of a photographic light or a peripheral area thereof in order to adjust an illumination and prevent the generation of a false color.

In an ordinary image taking in a visible-ray area by means of the image element comprising the CCD, an infrared-ray area constitutes an optical band interfering the image taking because the image taking including the infrared-ray area results in an image which cannot be recognized by viewers as a normal image. Therefore, as recited in No. 63-87889 of the Publication of the Unexamined Japanese Patent Applications, the infrared-ray cut filter is disposed in the optical path of the photographic light to thereby eliminate the infrared-ray area so that a favorable image taking of the visible-ray area can be realized. However, the image of the infrared-ray area is very effective in terms of image clarity in the case of photographing in a low-illumination environment such as photographing in nighttime and darkness.

As such, an image pickup device for realizing both of the conventional photographing and the photographing in the low-illumination environment is conventionally available. In the image pickup device, the infrared-ray cut filter is disposed in the optical path of the photographic light in the conventional photographing, the infrared-ray cut filter is retreated from the optical path of the photographic light when photographing in the low-illumination environment.

In realizing the foregoing image pickup device, it is necessary to provide a space in a peripheral area of the imaging element for disposing the infrared-ray cut filter and a mechanism for advancing/retreating the infrared-ray cut filter. Therefore, the foregoing constitution includes an optical system unit comprising a combination of the spectral color filter and imaging element (hereinafter, simply referred to as an optical system unit of a single plate type), and is employed in image pickup devices, which can afford the space in the peripheral area of the imaging element.

Figure 1:
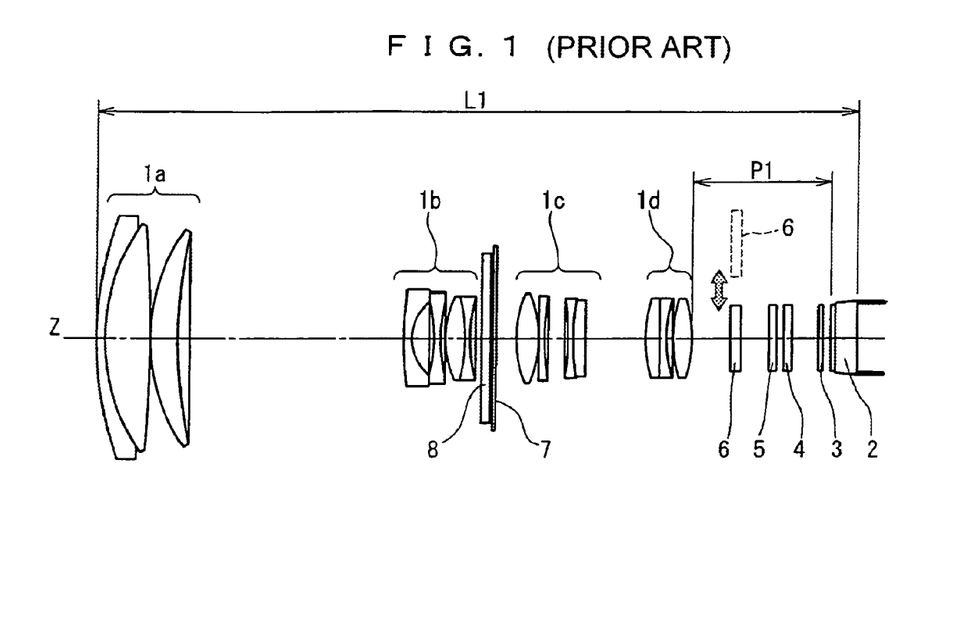
FIG. 1 shows a main part of an image pickup device including an optical system unit of a single plate type.

FIG. 1 shows an optical system (single plate-type optical system unit) of an image pickup device including the infrared-ray cut filter and its advancing/retreating mechanism. Referring to reference symbols in FIG. 1, $1a$-$1d$ denote a group of lenses, 2 denotes an imaging element, 3 denotes a spectral color filter, 4 denotes a dummy glass or the like, 5 denotes a low-pass filter, 6 denotes an infrared-ray cut filter, 7 denotes filters of different types, and 8 denotes an iris. Further, L1 denotes an optical path length from a front end of the group of lenses $1a$-$1d$ to the imaging element 2, Z denotes a central axis of an optical path of a photographic light, and P1 denotes a spatial length from a rear-most end of the group of lenses $1a$-$1d$ to the imaging element 2.

In the optical system (single plate-type optical system unit) shown in FIG. 1, the spatial length P1 can be relatively easily secured in a large dimension (approximately 10 mm or more) Therefore, the mechanism for advancing/retreating the infrared-ray filter 6 with respect to the optical path of the photographic light can be provided in the spatial length P1. The infrared-ray cut filter and its advancing/retreating mechanism are not shown in FIG. 1.

The realization of the constitution, however, is premised on that the peripheral area of the imaging element includes some spatial room for disposing the advancing/retreating mechanism for the infrared-ray cut filter 6. The premise can be satisfied in the before-mentioned single plate-type optical system unit, however, cannot be realized to a satisfactory level in the optical system unit comprised of a combination of the spectral prism and a plurality of imaging elements (hereinafter, referred to as an optical system unit of a spectral prism type).

Figure 2:
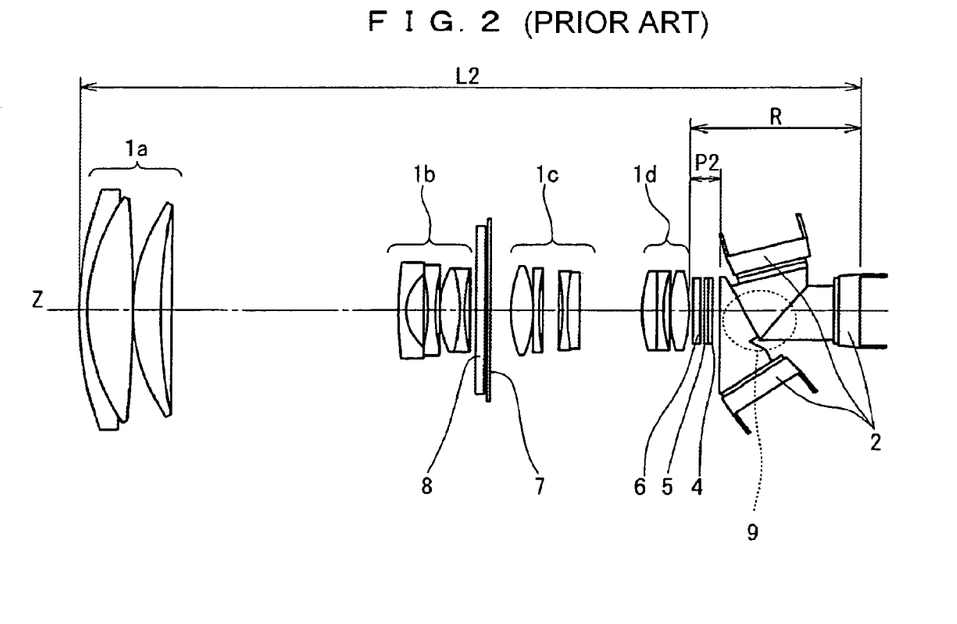
FIG. 2 shows a main part of an image pickup device including an optical system unit of a spectral prism type.

FIG. 2 shows that the foregoing premise cannot be satisfied in the spectral prism-type optical system unit. Reference symbols shown in FIG. 2 refer to the same components as in FIG. 1, except for a reference numeral 9 denoting a spectral prism provided in place of the spectral color filter 3, L2 denoting an optical path length from the front end of the group of lenses $1a$-$1d$ to the imaging elements 2, R denoting an image-formation area of the optical system, and P2 denoting a spatial length from the rear-most end of the group of lenses $1a$-$1d$ to the spectral prism 9. The spatial length P2 is a part of a spatial length in the image-formation area R and houses therein the infrared-ray cut filter 6.

In the spectral prism-type optical system unit, it is necessary to provide the spectral prism 9 for spectrally separate an entering light into three primary colors in the image-formation area R of the optical system, and further to provide the imaging elements 2 for imaging the respective spectrally-separated three primary colors in the image-formation area R. Because of the requirement, the spatial length P2 in the spectral prism-type optical system unit is narrower than the spatial length P1 in the single plate-type optical system unit, as a result of which the advancing/retreating mechanism for the infrared-ray cut filter 6 cannot be possibly provided in the spectral prism-type optical system unit.

As a possible way to secure the space for disposing the advancing/retreating mechanism for the infrared-ray cut filter 6 in the spectral prism-type optical system unit is to extend the entire optical length L2. In that manner, the spatial length P2 can be enlarged when the image-formation area R is moved rearward in the optical path. However, the extension of the entire optical length L2 is followed by a relative reduction of a performance and product potency, which is, therefore, unrealizable in practical use.

The spectral prism-type optical system unit exerts a relatively good spectral performance and sensitivity. Because of that, it is desirable to dispose the infrared-ray cut filter and the mechanism for advancing/retreating thereof with respect to the optical path of the photographic light without extending the entire optical length L2 in the spectral prism-type optical system unit characterized as described.

SUMMARY OF THE INVENTION

Therefore, a main object of the present invention is to enable both the conventional photographing and photographing in the low-illumination environment in the image pickup device comprising the optical system unit of the spectral prism type.

In order to achieve the object, an image pickup device according to the present invention is most importantly characterized in that an infrared-ray cut filter and a mechanism unit for advancing and retreating the infrared-ray cut filter between a position in an optical path of a photographic light and a position distant from the optical path of the photographic light are disposed in a luminous flux convergence area of the photographic light whose luminous flux is being adjusted by the group of lenses.

According to the foregoing constitution, the infrared-ray cut filter and its mechanism unit are disposed in an area (luminous flux convergence area), which can relatively easily accommodate the mechanism unit additionally disposed in a structure of the existing image pickup device so that the infrared-ray cut filter can be successfully advanced and retreated without extending an entire optical path length. Below is described a reason why the luminous flux convergence area is suitable for additionally disposing the mechanism unit.

The luminous flux convergence area, where the luminous flux of the photographic light is converged down, has a small luminous-flux area. Therefore, providing the infrared-ray cut filter in the area can lead to a reduction of an advancing/retreating stroke. Because of that, a structure of the advancing/retreating mechanism unit for the infrared-ray cut filter can be simplified achieving a size reduction. Further, in the luminous flux convergence area where the luminous flux is converged down, component units (for example, iris mechanism, and the like) for applying an optical adjustment to the photographic light is conventionally provided. Therefore, the luminous flux convergence area and its periphery are originally designed to have a structure capable of incorporating the mechanism for operating the component units. The luminous flux convergence area designed to have the structure is ideal to incorporate the infrared-ray cut filter and its mechanism unit. Therefore, the components can be precisely incorporated in the area applying a minimum modification to the design. On the contrary, it is not preferable to dispose any mechanical structured component in the image-formation area of the photographic light in terms of design, in order to maintain an image-formation state with a high precision.

Further, when the infrared-ray filter is disposed in the luminous flux convergence area, an image of scar/foreign particle in the optical path of the photographic light can be substantially prevented from being image-formed in the imaging elements because the image of the scar, foreign particle, or the like, disposed in the luminous flux convergence area is not brought to a focus on the imaging elements.

To describe the luminous flux convergence area, it denotes an area where the photographic light is the most intensively converged by the group of lenses. In the present invention, the luminous flux convergence area is defined as follows. When a diameter of the luminous flux in the luminous flux convergence area is hypothetically denoted by d', and a diameter of the luminous flux at a point where the light is the most intensively converged by the group of lenses (most intensive convergence point) by d, an area calculated as $d' \leq d \times 1.3$ is defined as the luminous flux convergence area.

It is preferable to use a thin filter (thickness of 0.1-2.0 mm) for the infrared-ray cut filter within a range where an optical property thereof can be maintained. Then, a load of the mechanism unit and a required mounting space can be further reduced, and the mechanism unit itself can be made thinner to thereby reduce the entire optical path length.

BRIEF DESCRIPTION OF THE DRAWINGS

These and other objects as well as advantages of the invention will become clear by the following description of preferred embodiments and explicit in the appended claims of the invention. Many other benefits of the invention not recited in this specification will come to the attention of those skilled in the art upon implementing the present invention.

FIG. 7 show a mechanism unit as a main part of the image pickup device according to the present embodiment, wherein A is a frontal view, and B is a side view.

DETAILED DESCRIPTION OF THE INVENTION

Hereinafter, a preferred embodiment of the present invention is described referring to the drawings.

FIGS. 3-7 denote a photographing device 1 according to an embodiment of the present invention. Referring to reference symbols in the drawings, 10 denotes an optical system unit of a spectral prism type, 11 denotes a changeover switch for changeover between a conventional photographing and a low-illumination photographing, 12 denotes an infrared-ray emission auxiliary lighting unit (infrared-ray emission unit) in the case of the low-illumination photographing, 1a denotes a group of front lenses, 1b denotes a group of zoom lenses, 1c denotes a group of correction lenses for hands movement, 1d denotes a group of focusing lenses, 2 denotes imaging elements, 5 denotes an optical low-pass filter, 7 denotes an optional optical filter, 8 denotes an iris main body, 9 denotes a spectral prism, 13 denotes an infrared-ray cut filter, 14a denotes a mechanism unit, 14b denotes an iris mechanism unit, L denotes an entire optical path length in the optical system, Q denotes a luminous flux convergence area in the optical system, R denotes an image-formation area in the optical system, and Z denotes a central axis of the optical path in the optical system.

The group of front lenses 1a, group of zoom lenses 1b, group of hand-movement correction lenses 1c, and group of focusing lenses 1d constitute groups of lenses for adjusting the luminous flux of the photographic light so as to image-form the photographic light. The spectral prism 9 spectrally separates the photographic light whose luminous flux is already adjusted by the groups of lenses.

Figure 6:
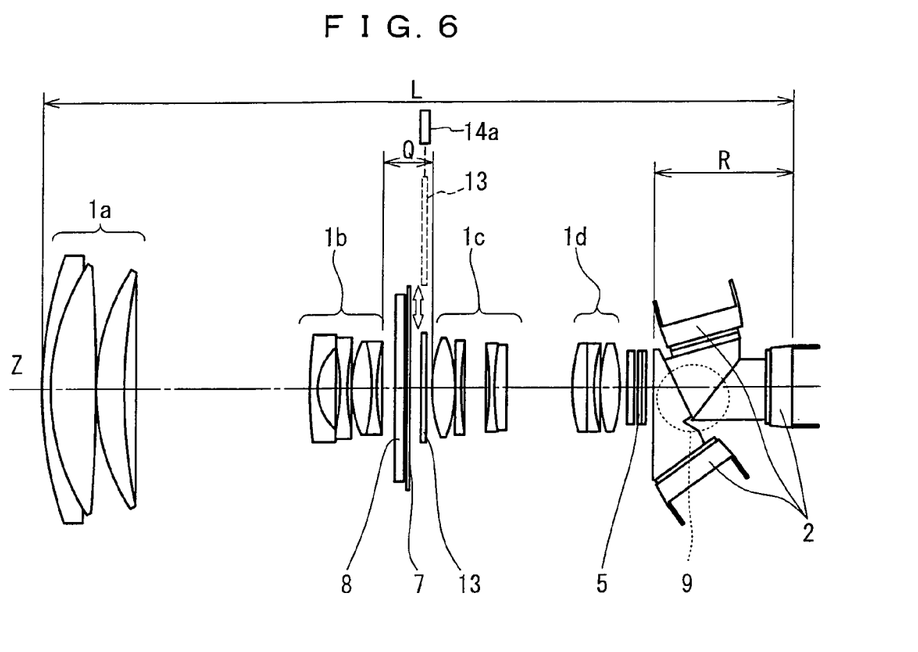
FIG. 6 shows an optical system of the image pickup device according to the embodiment.

According to the present embodiment, the luminous flux convergence area Q is set at a central position in the optical path in the optical system (a central position in a longitudinal direction in the entire optical path length L). However, the position of the luminous flux convergence area Q can be shifted therefrom forward or backward in the optical path based on a design change of the optical system. The image-formation area R is set at a rear-end position in the optical path of the photographic light in the optical system (a rear-most end position in the entire optical path length L).

The group of front lenses 1a is disposed in a front end of the optical path in the optical system. The spectral prism 9 is disposed in the image-formation area R. There are three imaging elements 2 provided corresponding to three primary colors spectrally separated by the spectral prism 9. The imaging elements 2 are respectively provided in spectral output ends of the spectral prism 9. The imaging elements 2 respectively take images of the lights spectrally separated by the spectral prism 9.

The group of focusing lenses 1d is disposed in the rearmost end of the optical path of the photographic light and immediately prior to the image-formation area R. The optical filter 7, iris main body 8, and infrared-ray cut filter 13 are disposed in the luminous flux convergence area Q. The infrared-ray cut filter 13 has a function for eliminating an infrared-ray element in the photographic light whose luminous flux is being adjusted. The group of zoom lenses 1b is disposed at a position immediately prior to the luminous flux convergence area Q in the optical path. The group of hand-movement lenses 1c is disposed immediately after the luminous flux convergence area Q in the optical path.

The mechanism unit 14a is a mechanism unit for advancing and retreating the infrared-ray cut filter 13 disposed in the luminous flux convergence area Q between the position in the optical path of the photographic light and the position distant from the optical path of the photographic light along a direction orthogonal to the optical path of the photographic light (radial direction). The iris mechanism unit 14b is a mechanism unit for adjusting a diaphragm condition of the iris main body 8 disposed in the luminous flux convergence area Q. The iris mechanism unit 14b is disposed along the direction orthogonal to the optical path of the photographic light (radial direction of diaphragm) and fixedly fitted to a casing 10a of the spectral prism-type optical system unit 10. The mechanism unit 14a is fixedly fitted to a main surface $14b_1$ of the iris mechanism unit 14b.

Figure 7A:
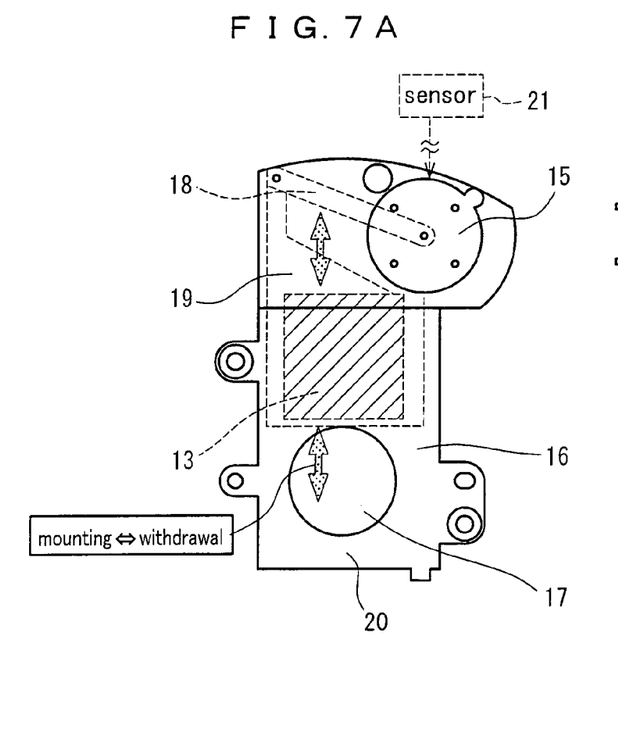
Figure 7B:
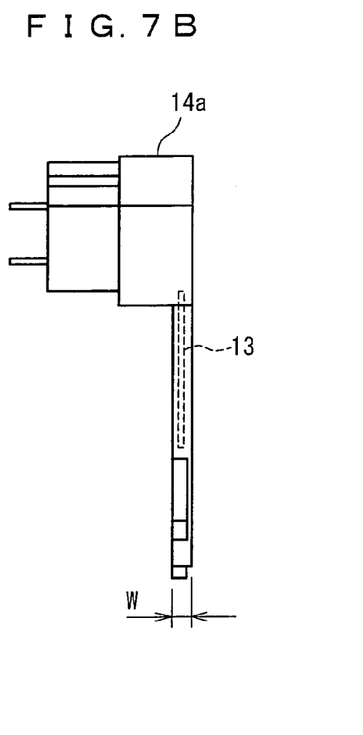

In the state where the iris mechanism unit 14b is fixedly fitted to the casing 10a, the main surface $14b_1$, thereof is formed in a plane-surface shape along the direction orthogonal to the optical path of the photographic light (radial direction of diaphragm). A main surface $14a_1$ of the mechanism unit 14a, which serves as a mounting surface, is formed in a plane-surface shape. Therefore, when the mechanism unit 14a is mounted on the iris mechanism unit 14b with the main surface $14a_1$ abutting the main surface $14b_1$, the mechanism unit 14a is disposed along the direction orthogonal to the optical path of the photographic light (radial direction of diaphragm) without applying any additional adjustment to the positioning. The mechanism unit 14a is mounted on the iris mechanism unit 14b, for example, by means of a screw.

The mechanism unit 14a comprises a flat plate 19 for retaining the infrared-ray cut filter 13, an electric actuator 15 for driving the flat plate 19, and an arm 18 for transmitting a drive to the flat plate 19 in response to a rotational movement of the electric actuator 15. The infrared-ray cut filter 13, flat plate 19, electric actuator 15 and arm 18 are housed in a casing 20 having a flat-plate shape. An opening 17 is formed in the casing 20. The opening 17 is provided in the casing 20 so that the opening 17 is disposed in the optical path of the photographic light under the circumstances of the mechanism unit 14b remaining mounted on the mechanism unit 14a. The opening 17 has a diameter equal to or larger than an effective diameter for the luminous flux of the photographic light to pass in the optical path of the photographic light in the luminous flux convergence area Q.

The flat plate 19 is subjected to the drive transmitted from the electric actuator 15 via the arm 18 and iteratively performs a linear movement in the casing 20 along a plane direction thereof. The infrared-ray cut filter 13 mounted on the flat plate 19 reciprocates between a position in the opening 17 (filter mounting position) and a position distant from the opening 17 (filter withdrawing position) in response to the iterative and linear movement of the flat plate 19. The flat plate 19 is disposed in parallel with the main surface (mounting surface) $14a_1$ of the mechanism unit 14a, and further, iteratively performs a linear movement in parallel with the main surface (mounting surface) $14a_1$.

In the mechanism unit 14a and the iris mechanism unit 14b which structurally drives the iris main body 8 and the infrared-ray cut filter 13 along a plane direction thereof, a thickness thereof in the optical path of the photographic light can be restricted to approximately 1 mm-5 mm.

Hereinafter, an operation of the photographic device 1 comprising the foregoing spectral prism-type optical system unit 10 is described.

Figure 3:
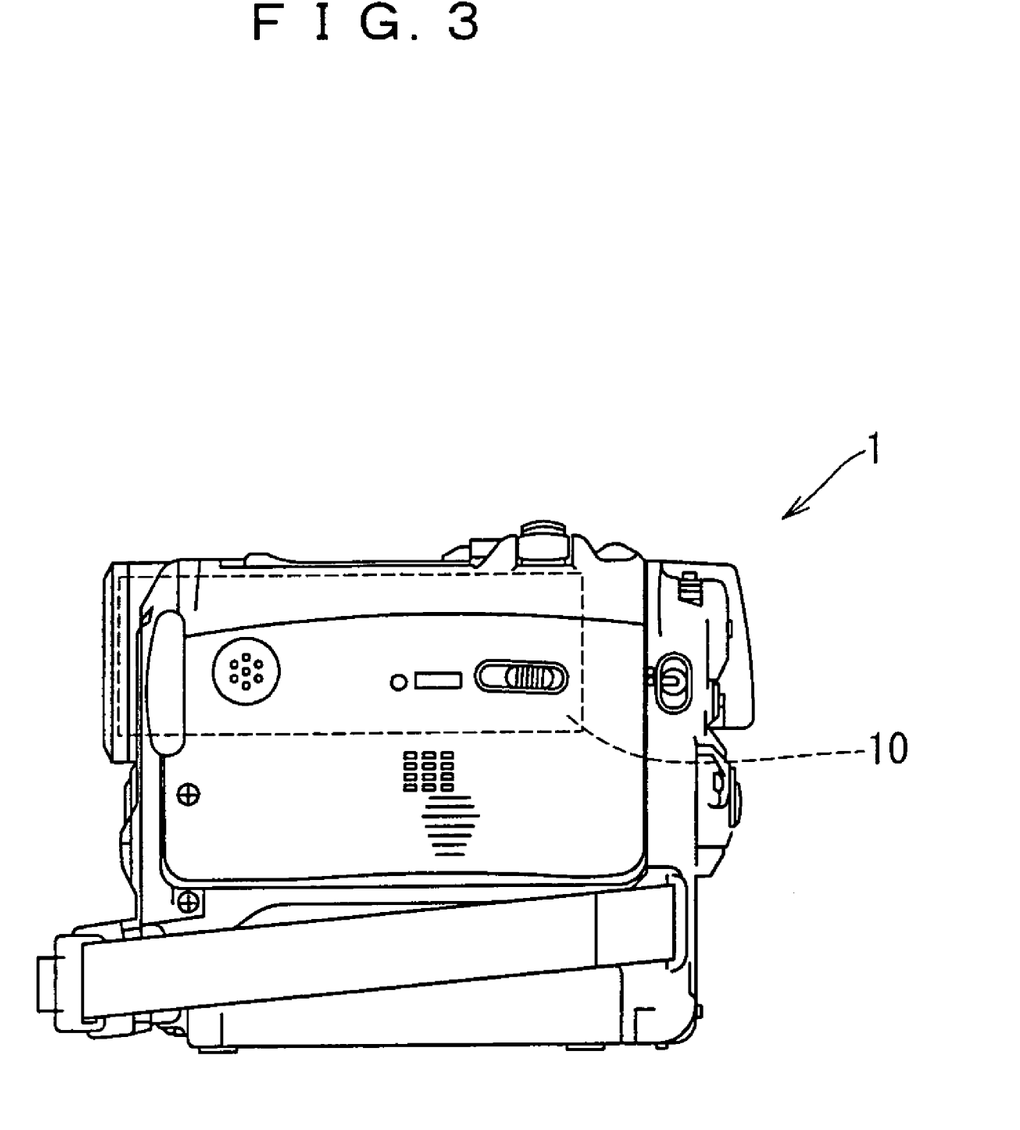
FIG. 3 shows an external appearance of an image pickup device according to an embodiment of the present invention.
Figure 4:
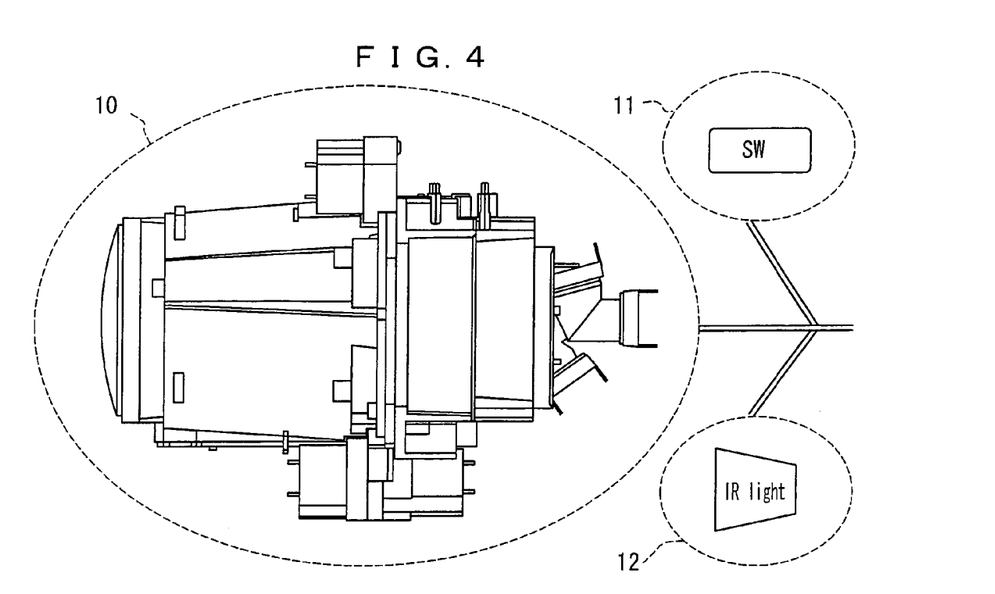
FIG. 4 shows an external appearance of a main part of the image pickup device according to the embodiment.
Figure 5:
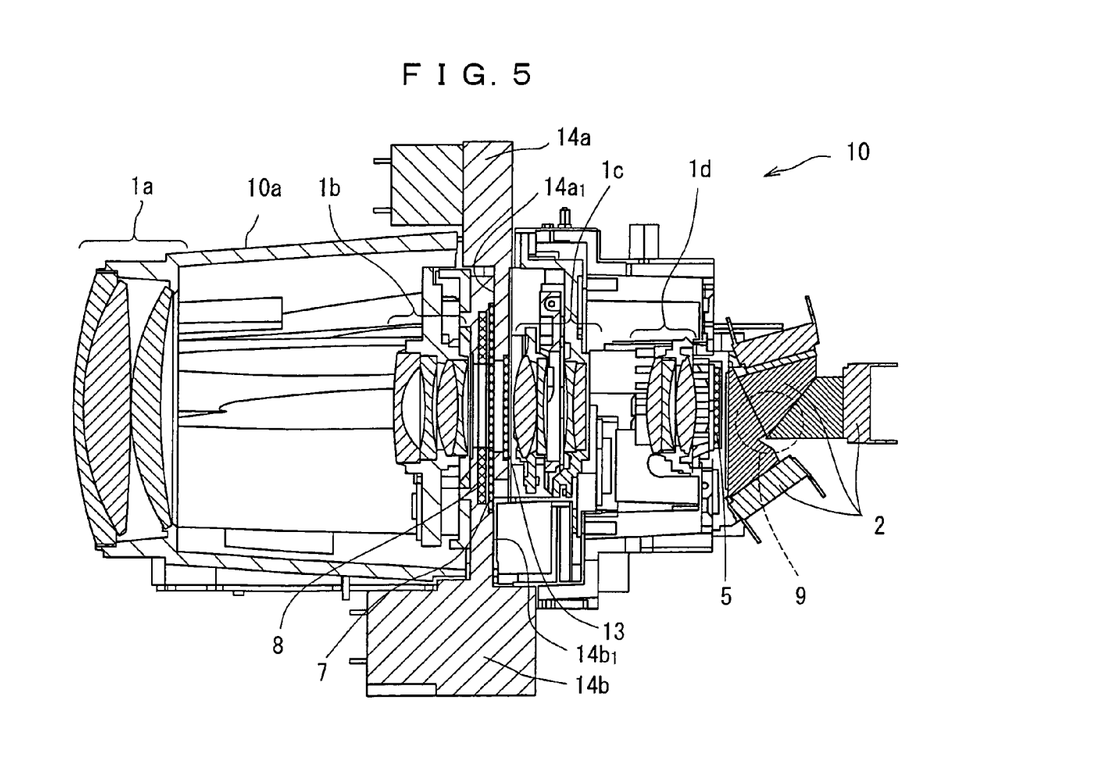
FIG. 5 shows the main part of the image pickup device according to the embodiment in section.

When a photographing mode is shifted to a low-illumination photographing mode in response to an input operation by an operator of the photographing device 1 with respect to the changeover switch 11, a control unit (not shown) of the photographing device 1 receives a signal of the shift and transmits a low-illumination photographing mode instruction signal to the infrared-ray emission auxiliary lighting unit 12 and the optical system unit 10. The infrared-ray emission auxiliary lighting unit 12 receives the instruction signal and emits the infrared ray to thereby illuminate a photographic subject by the infrared ray. The mechanism unit 14a of the spectral prism-type optical system unit 10 drives the flat plate 19 by means of the electric actuator to thereby move the infrared-ray cut filter 13 to the position withdrawing from the optical path of the photographic light. The infrared-ray photographing can be thereby performed.

Meanwhile, when the photographing mode is shifted to a conventional photographing mode by means of the changeover switch 11, the control unit (not shown) of the photographing device 1 receives a signal of the shift and transmits a conventional photographing mode instruction signal to the infrared-ray emission auxiliary lighting unit 12 and the optical system unit 10. The infrared-ray emission auxiliary lighting unit 12 receives the instruction signal and halts the emission of the infrared ray, and the mechanism unit 14a of the spectral prism-type optical system unit 10 drives the flat plate 19 by means of the electric actuator 15 to thereby move the infrared-ray cut filter 13 in the optical path of the photographic light. The conventional photographing can be thereby performed.

As an alternatively possible constitution, a sensor 21 for detecting a brightness of a photographing environment may be provided in place of the changeover switch 11, wherein the shift is performed between the conventional photographing and the low-illumination photographing based on the brightness of the photographing environment measured by the sensor 21.

In the spectral prism-type optical system unit 10, it is not possible to dispose the infrared-ray cut filter 13 and the mechanism unit 14a in the image-formation area R unless the entire optical path length L is extended because the spectral prism 9 is disposed in the image-formation area R.

In the spectral prism-type optical system unit 10, therefore, the mechanism unit 14a and the infrared-ray cut filter 13 are not disposed in the image-formation area R, but in the luminous flux convergence area Q. Therefore, the infrared-ray cut filter 13 can be iteratively advanced and retreated without extending the entire optical path length L.

In the described embodiment, the mechanism unit 14a and the iris mechanism unit 14b are separate bodies. An alternative arrangement may be that the electric actuator 15 also serves as an opening/closing drive source of the iris main body 8 and the arm 18 is incorporated into the iris mechanism unit 14b so that the both mechanisms 14a and 14b can be an identical mechanism. Such an arrangement can reduce the number of the components and the area where the mechanisms 14a and 14b are disposed.

Further, it is preferable to make the infrared-ray cut filter 13 thinner to approximately 0.1-2.0 mm within a range where a filter property can be maintained in order to reduce a thickness of the mechanism unit 14a and a drive load with respect to the electric actuator.

According to the constitution, in the photographing device 1 comprising the spectral prism-type optical system unit, the infrared-ray cut filter and the mechanism unit for advancing/retreating the filter are provided in the luminous flux convergence area Q so that the photographing can be favorably performed in nighttime and darkness without extending the entire optical path length in the photographing device. Thereby, the photographing can be realized in nighttime and darkness as well as daytime in the image pickup device comprising the optical system unit of the spectral prism type capable of exerting a relatively good spectral performance and sensitivity.

Further, the photographing device 1 offers such an advantage that an image of scar/foreign particle in the optical path of the photographic light can be substantially prevented from being image-formed in the imaging elements 2 by providing the infrared-ray cut filter 13 in the luminous flux convergence area Q. Below is described a reason for the advantage.

In the infrared-ray cut filter 13, the scar/foreign particle may be attached on a surface thereof. In particular, in the constitution according to the present invention where the infrared-ray cut filter 13 is iteratively advanced and retreated by the mechanism unit 14a, the iterative movement easily leads to the formation of the scar/foreign particle. In the case of disposing the infrared-ray cut filter 13 very close the image-formation area R, the image of the scar/foreign particle attached on the infrared-ray cut filter 13 is visibly image-formed in the imaging elements 2. The problem also occurs in the case of disposing the infrared-ray cut filter 13 immediately after the group of front lenses 1a. In those cases, the image of the scar/foreign particle approaches as close as possible to a focusing range of the spectral prism-type optical system unit, which results in a clear image formation.

In contrast, the image of the photographic object (scar/foreign particle) disposed in the luminous flux convergence area Q is not brought to a focus on the imaging elements 2. In the constitution according to the according to the present invention where the infrared-ray cut filter 13 is disposed in the luminous flux convergence area Q, the image of the scar/foreign particle attaching the infrared-ray cut filter 13, if any, is quite blurred on the imaging elements 2, therefore creating very little influence on the image resulting from the scar/foreign particle.

Further, in the photographing device 1, the iris 8 and the mechanism unit 14b for driving the iris 8 is provided in the luminous flux convergence area Q as well as the infrared-ray cut filter 13. In the photographing device 1 constituted as such, the mechanism unit 14a for reiteratively advancing/retreating the infrared-ray cut filter 13 is mounted on the iris mechanism unit 14b. The iris mechanism unit 14b is an indispensable component in the photographing device 1 and structurally designed so as to be precisely mounted in a conventional image pickup device.

In the photographing device 1, the main surface $14b_1$ of the iris mechanism unit 14b, which already achieves such an outstanding mounting precision in the past structural design, is redesigned to have a plane-surface shape, and the main surface $14a_1$, of the mechanism unit 14a is formed in the flat-plate shape. Then, the mechanism unit 14a is mounted on the iris mechanism unit 14b with their respective main surfaces $14a_1$, and $14b_1$ thereof abutting each other.

In the photographing device 1 having the foregoing mounting structure, a high level of the mounting precision of the mechanism unit 14a can be maintained when the following relatively simple structural conditions are realized:

The main surface $14b_1$ of the iris mechanism unit 14b is formed in the plane-surface shape with a high precision and disposed orthogonal to the optical path of the photographic light.

The main surface $14a_1$ of the mechanism unit 14a is formed in the plane-surface shape with a high precision.

The mounting precision mentioned above is the precision by which the infrared-ray cut filter 3 is disposed along the direction orthogonal to the optical path of the photographing light (radial direction).

Figure 8:
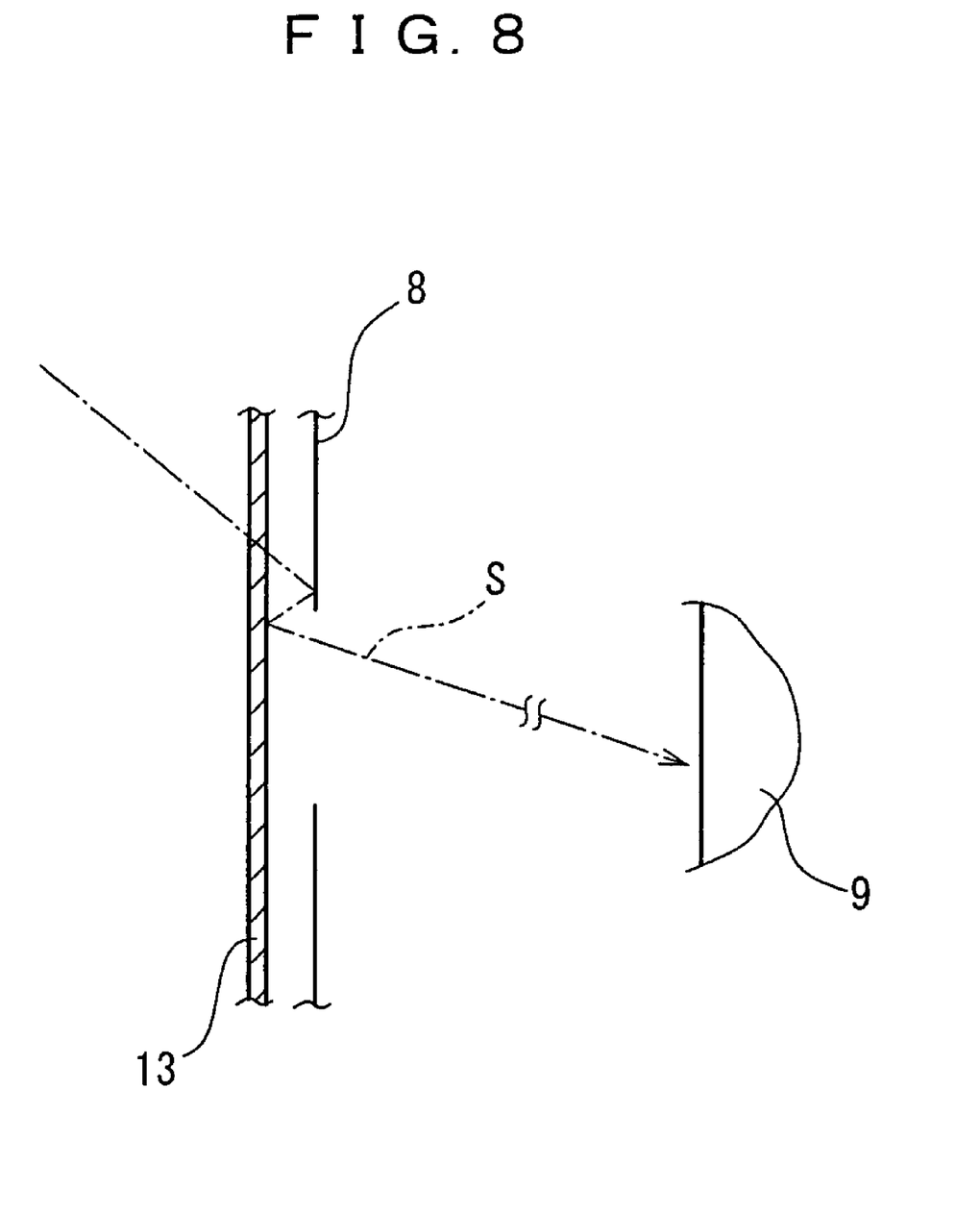
FIG. 8 is an illustration of an effect achieved by the present invention.

Further, in the photographing device 1, the infrared-ray cut filter 13 is provided immediately after the iris 8 in the optical path of the photographic light. Thereby, a diffuse reflection of the light generated on a surface of the iris main body 8 can be prevented from reaching the imaging elements 2. In the case where the infrared-ray cut filter 13 is provided immediately prior to the iris main body 8 in the optical path of the photographic light, as shown in FIG. 8, the diffuse reflection of the light generated on the surface of the iris main body 8 advances in a direction reverse to the optical path and is reflected again in the infrared-ray cut filter in a forward direction relative to the optical path and further advances, passes through the iris main body 8, group of hand-movement correction lenses 1c, and group of focusing lenses 1d, and reaches the spectral prism 9 to finally enter the imaging elements 2. A reference symbol S in FIG. 8 denotes the diffuse reflection of the light.

In contrast to that, in the photographing device 1 where the infrared-ray cut filter 13 is disposed immediately after the iris main body 8 in the optical path of the photographic light, it is structurally not possible for the diffuse reflection of the light generated on the surface of the iris main body 8 to be reflected in the forward direction relative to the optical path. Therefore, the diffuse reflection of the light does not possibly enter the imaging elements 2.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An image pickup device comprising:
   a group of lenses for adjusting a luminous flux of a photographic light so as to image-form the photographic light;
   a spectral prism for spectrally separating the photographic light provided in an image-formation area of the photographic light whose luminous flux is adjusted by the group of lenses;
   imaging elements for respectively imaging lights spectrally separated by the spectral prism;
   an infrared-ray cut filter for eliminating an infra-red element of the photographic light whose luminous flux is being adjusted; and
   a mechanism unit for advancing and retreating the infrared-ray cut filter between a position in an optical path of the photographic light and a position distant from the optical path of the photographic light, wherein
the infrared-ray cut filter and the mechanism unit are disposed in a luminous flux convergence area of the photographic light whose luminous flux is being adjusted by the group of lenses.

2. An image pickup device as claimed in claim 1, wherein an iris mechanism for adjusting a diaphragm of the photographic light is provided in the luminous flux convergence area and the mechanism unit is mounted on the image pickup device via the iris mechanism.

3. An image pickup device as claimed in claim 2, wherein the infrared-ray cut filter is provided immediately after the iris mechanism in the optical path of the photographic light.

4. An image pickup device as claimed in claim 3, wherein a main surface of the iris mechanism and a main surface of the mechanism unit respectively orthogonal to a central axis of the optical path of the photographic light are formed in a plane-surface shape and the mechanism unit is located relative to the iris mechanism by arranging the main surfaces abut each other.

5. An image pickup device as claimed in claim 1, further comprising an infrared-ray emission unit for emitting the infrared ray to a photographic object, wherein
the mechanism unit moves and disposes the infrared-ray cut filter in the optical path of the photographic light during a period when the infrared-ray emission unit is emitting the infrared ray.

6. An image pickup device as claimed in claim 1, wherein
the infrared-ray cut filter is formed from a glass material of 0.1 mm-2.0 mm in thickness.

7. An image pickup device as claimed in claim 1, wherein the luminous flux convergence area of the photographic light is located at a central position in the optical path of the photographic light.

8. An image pickup device as claimed in claim 1, wherein the luminous flux convergence area of the photographic light is located between a front lens and a focusing lens.

9. An image pickup as claimed in claim 1, wherein the infrared-ray cut filter is located between a front lens and a focusing lens.

10. An image pickup device as claimed in claim 1, wherein the luminous flux convergence area of the photographic light is located between a zoom lens and a correction lens.

11. An image pickup device as claimed in claim 10, wherein the zoom lens and the correction lens are located between a front lens and a focusing lens.

12. An image pickup device as claimed in claim 1, wherein infrared-ray cut filter is located between a zoom lens and a correction lens.

13. An image pickup device as claimed in claim 12, wherein the zoom lens and the correction lens are located between a front lens and a focusing lens.

* * * * *